United States Patent [19]
Daris et al.

[11] Patent Number: 5,456,487
[45] Date of Patent: Oct. 10, 1995

[54] PASSENGER AIR BAG DOOR

[75] Inventors: Fred Daris, Clarkston; Randall J. Ryszewski, Grosse Pointe Woods; John Rust, Rochester, all of Mich.

[73] Assignee: Chrysler Corporation, Highland Park, Mich.

[21] Appl. No.: 293,263

[22] Filed: Aug. 22, 1994

[51] Int. Cl.⁶ .......................... B60R 21/20; B60R 21/22
[52] U.S. Cl. ........................ 280/728.3; 280/732
[58] Field of Search ............... 280/732, 728 B, 280/752, 728 A, 728 R, 730 R, 731

[56] References Cited

U.S. PATENT DOCUMENTS

| | | | |
|---|---|---|---|
| 4,989,896 | 2/1991 | DiSalvo et al. | 280/732 |
| 5,082,310 | 1/1992 | Bauer | 280/732 |
| 5,183,288 | 2/1993 | Inada et al. | 280/728 B |
| 5,183,289 | 2/1993 | Zeller et al. | 280/728 B |
| 5,280,947 | 1/1994 | Cooper | 280/728 B |
| 5,375,876 | 12/1994 | Bauer et al. | 280/732 |
| 5,378,014 | 1/1995 | Cooper | 280/732 |

FOREIGN PATENT DOCUMENTS

| | | | |
|---|---|---|---|
| 0158444 | 6/1990 | Japan | 280/728 A |
| 5185898 | 7/1993 | Japan | 280/752 |

*Primary Examiner*—Richard M. Camby
*Assistant Examiner*—Peter C. English
*Attorney, Agent, or Firm*—Edward A. Craig

[57] ABSTRACT

An instrument panel assembly comprises an instrument panel wall having an opening through which an air bag is deployed. The opening is normally closed by a pair of doors. Each door has a metal door panel provided with an integral hinge extending along the curved edge of the opening. The hinge is curved to match the curve of the edge. The hinge is slotted at spaced points along its length. A plastic pad covers the swinging edge portion of each door panel. The pads and slots resist kinking of the hinges when the doors swing open.

3 Claims, 4 Drawing Sheets

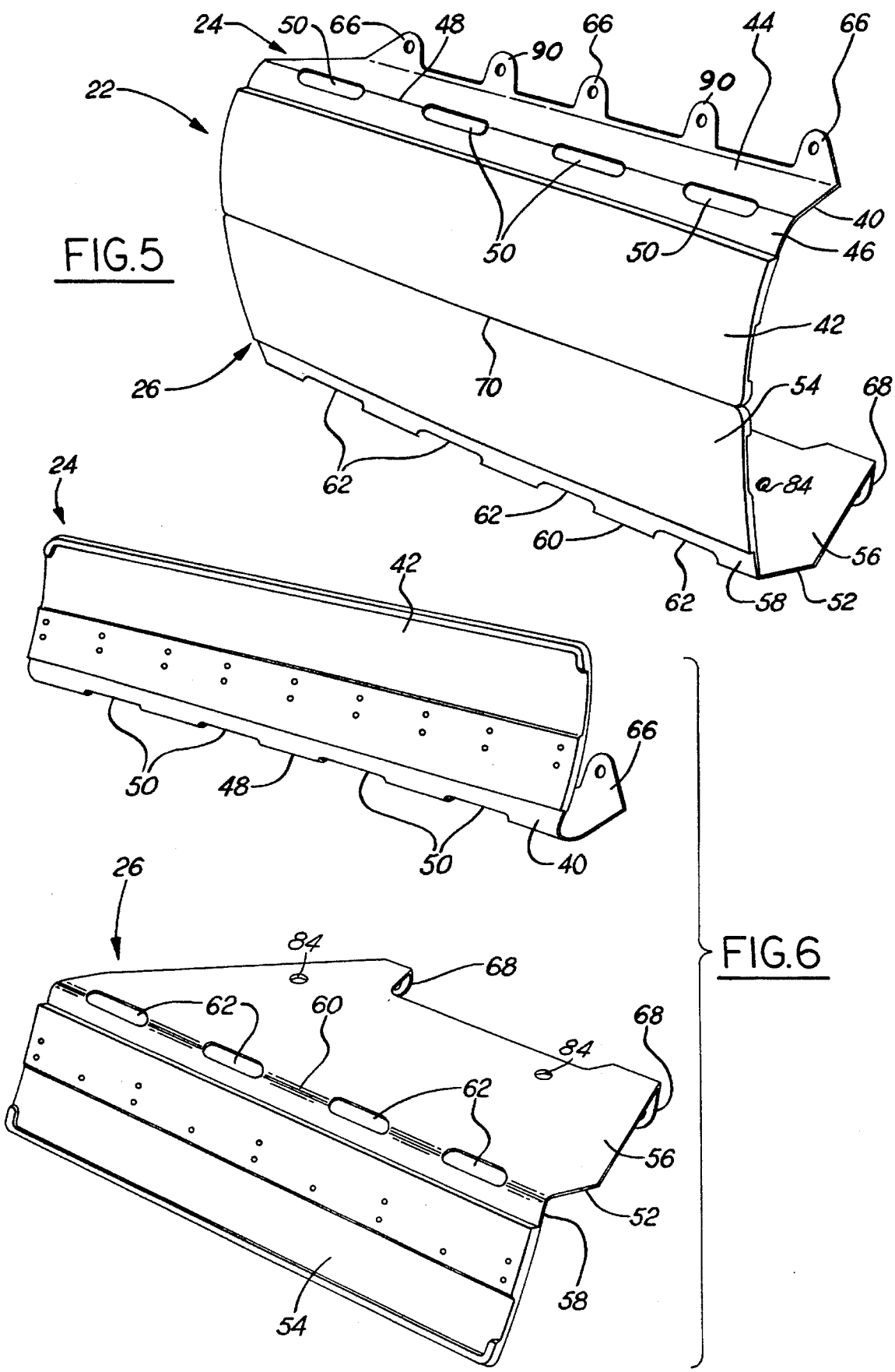

PASSENGER AIR BAG DOOR

FIELD OF INVENTION

This invention relates generally to occupant restraint systems for automotive vehicles and refers more particularly to a closure for an opening in the instrument panel through which an air bag deploys.

BACKGROUND AND SUMMARY OF THE INVENTION

When an air bag is stored behind the instrument panel of an automotive vehicle, the instrument panel covers and conceals the air bag but must not interfere with its deployment. In the past, the instrument panel has been formed with a door or doors capable of swinging open to permit the air bag to deploy. However, the expanding air bag strikes the doors with considerable force, sometimes causing them to rip loose or break apart. This subjects the passenger to the risk of serious injury. Also, the wall of the instrument panel to which the doors are hinged is often curved, and when the door hinge is likewise curved, the hinge has a tendency to kink when the door swings open. Kinking of the hinge interferes with proper door opening and deployment of the air bag.

In accordance with the embodiment of the present invention about to be described, the instrument panel has a curved wall provided with a closure preferably comprising a pair of doors which swing apart to form an opening through which the air bag deploys. The edge of the opening is curved because the instrument panel wall is curved. Each door is made of two components, namely, a structural member or panel which has an integral hinge at the edge of the door opening, and a pad preferably molded on the swinging edge portion of the door. The hinge is curved to match the curve of the edge of the door opening and hence has a tendency to kink when the door opens. The hinge is preferably formed with spaced apart slots which create in effect several aligned hinge points to facilitate bending. The pad puts additional weight at the outer edge of the door and together with the slots in the hinge prevent the hinge from kinking.

Preferably, the structural member or panel of the door is made of metal so that it is stronger and able to withstand the extremely high forces placed on the hinge when the door opens, and the pad is made of a resinous plastic material so that it will not cut or injure a passenger and will be resistant to dents.

The air bag canister needs to be anchored properly so that when the air bag inflates, it deploys in the intended direction for proper impact against the doors. The air bag should deploy in a path which is substantially perpendicular to the doors, but if the canister is not properly attached, it has a tendency to rock downwardly, changing the direction in which the air bag expands and reducing the effectiveness of the air bag in opening the door. In accordance with this invention, the air bag canister is attached in a way which prevents the canister from rocking when the air bag deploys.

One object of this invention is to provide an instrument panel assembly having the foregoing features.

Another object is to provide an instrument panel assembly which is of relatively simple construction, rugged and durable in use, and relatively inexpensive to manufacture and install.

These and other objects, features and advantages will become more apparent as the following description proceeds, especially when considered with the accompanying drawings.

BRIEF DESCRIPTION OF THE DRAWINGS

FIG. 5 is a detail view in perspective of the doors which close the air bag opening, shown in their normally closed position.

FIG. 6 is a detail view in perspective of the doors in open position.

DETAILED DESCRIPTION

Figure 1:
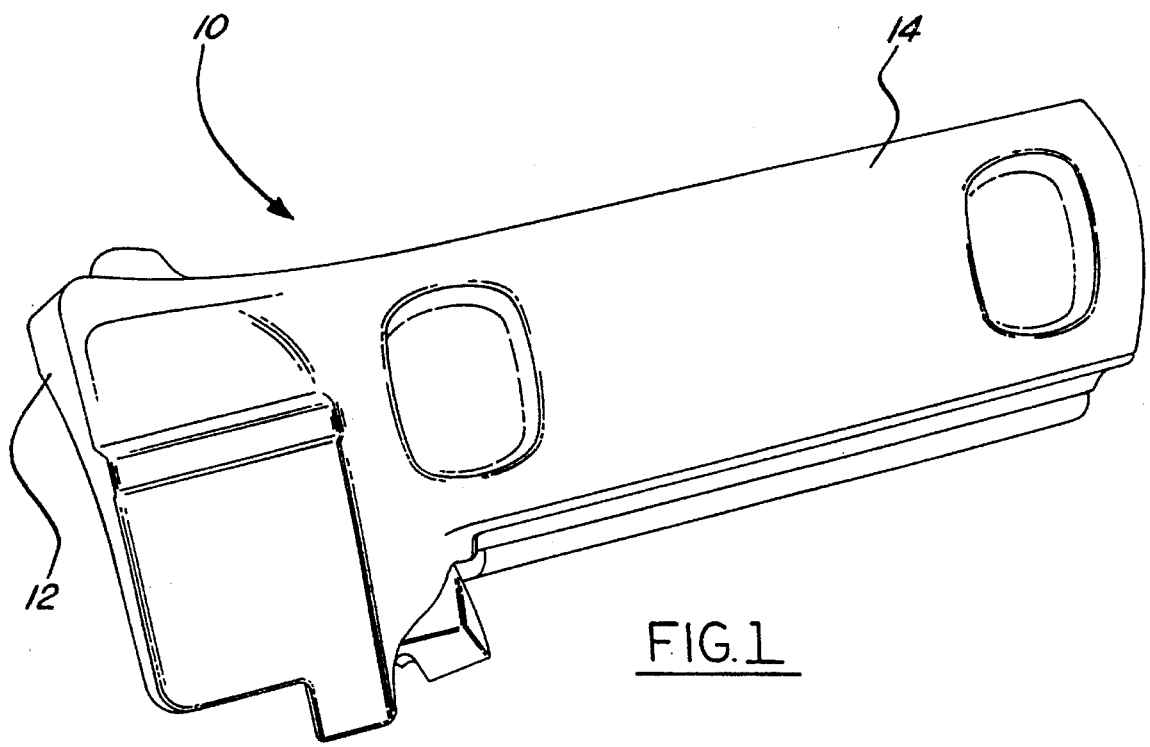
FIG. 1 is a perspective view of an instrument panel assembly constructed in accordance with the invention, with the doors covering the air bag opening concealed by a decorative cover overlay.

Referring now more particularly to the drawings, the instrument panel assembly 10 comprises an instrument panel 12 covered with a layer 14 of vinyl or the like to provide a decorative overlay. Foam padding 15 is sandwiched between the instrument panel 12 and the vinyl layer 14.

The instrument panel 12 preferably is made of a relatively stiff, self-supporting, flexible resinous thermoplastic material such, for example, as a mixture of acrylonitrile-butadiene-styrene (ABS) and polycarbonate, molded to any desired configuration. The instrument panel has a wall 18 formed with an opening 20 normally closed by a closure 22 consisting of upper and lower doors 24 and 26. A confined, uninflated air bag 28 is stored out of sight in a canister 30 directly in front of the normally closed opening 20.

The opening 20 in wall 18 is generally rectangular, having laterally spaced generally vertical side edges 32 and 34 and vertically spaced generally horizontal upper and lower edges 36 and 38.

The upper door 24 preferably consists of two components, namely, a structural member in the form of a plate or panel 40 and a pad 42. The panel 40 is preferably made of metal, such as sheet steel or aluminum, and is relatively strong and stiff, but flexible and bendable. Panel 40 has an attaching portion 44 at the top and a main body portion 46 connected to the attaching portion 44 by an elongated integral hinge 48. The hinge 48 is formed with slots 50 spaced apart along its length. These slots provide in effect individual hinge points which make the hinge more flexible and easier to bend.

The pad 42 is preferably made of a resinous plastic material which may be the same as the material of which the instrument panel is made. The pad 42 is molded on the swinging edge portion of the main body portion 46 of the door panel 40.

The lower door 26 is very similar in construction to the upper door 24. The lower door 26 also preferably consists of two components, namely, a structural member in the form of a plate or panel 52 and a pad 54. The panel 52 like panel 40, is preferably made of metal, such as sheet steel or aluminum and is relatively strong and stiff, but flexible and bendable. The panel 52 has an attaching portion 56 at the bottom and a main body portion 58 connected to the attaching portion 56 by an elongated integral hinge 60. The hinge 60, like hinge 48, is formed with slots 62 spaced apart along its length which in effect divide the hinge into individual hinge points to make the hinge more flexible and bendable.

The pad 54 is made of the same material as pad 42 and is molded on the swinging edge portion of the main body portion 58 of the door panel 52.

The attaching portion 44 of the upper door 24 has tabs 66 which are secured to bosses 67 formed on the instrument panel. The hinge 48 of the panel 40 extends along and is substantially co-extensive with the upper edge 36 of the opening 20.

Figure 2:
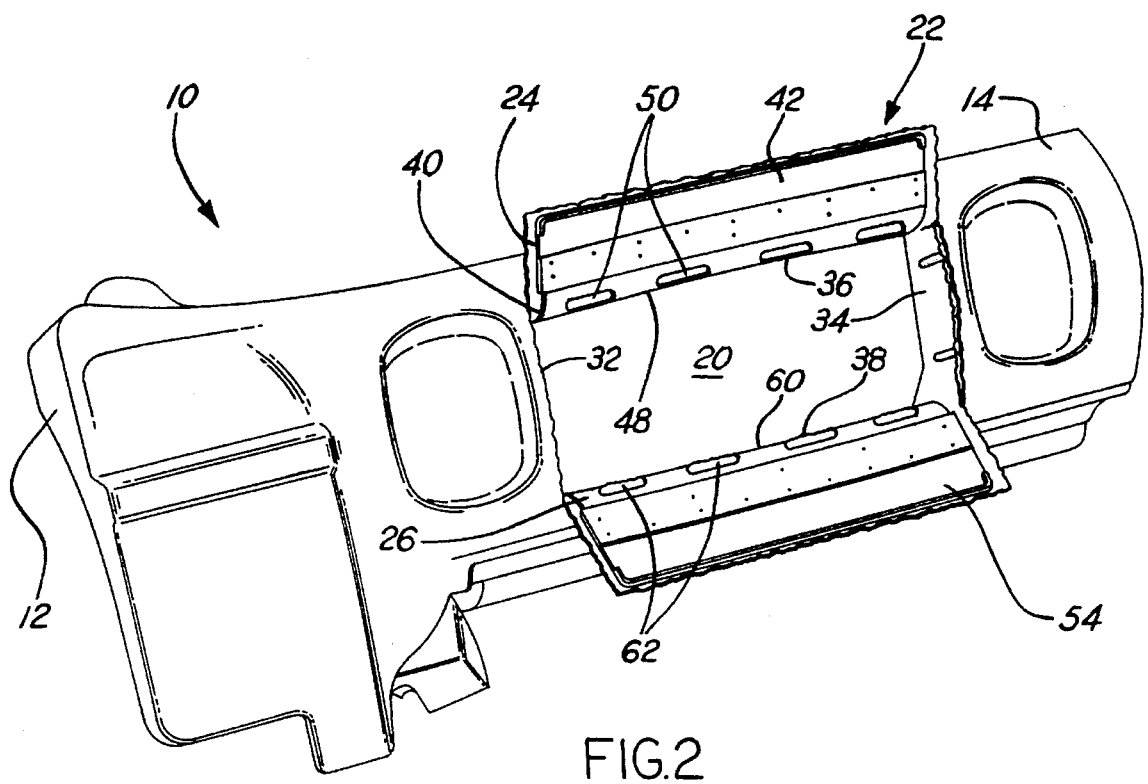
FIG. 2 is a perspective view of the instrument panel assembly but showing the doors after they have been forced open by an inflating air bag. For clarity of illustration, the air bag canister and air bag are not shown.

The upper edge 36 of the opening 20 is curved slightly as may be seen through the slots in FIG. 2. The amount of curvature is not large, but occurs as a result of the fact that the wall of the instrument panel where the opening is formed is itself curved, both horizontally and vertically. It is the curvature in the horizontal direction which is primarily responsible for the curvature of the upper edge 36. The curvature in the edge 36 is not necessarily desirable, but is a result of and generally matches the curvature which is designed into the instrument panel for functional as well as aesthetic reasons. The hinge 48 which is substantially co-extensive with the upper edge 36 of the door opening 20 is for practical reasons configured to match the curvature of the upper edge 36 of the opening.

The attaching portion of the lower door 26 has tabs 68 which are secured to bosses 69 formed on the instrument panel. The hinge 60 of the lower door extends along and is substantially co-extensive with the lower edge 38 of the opening 20. The lower edge of the opening, like the upper edge, is curved somewhat because of the curvature primarily in the horizontal direction of the instrument panel wall itself. Here again, the curve in the lower edge of the opening is not particularly desirable but results from the curvature or contour in the wall of the instrument panel. The hinge 60 of the lower door extends along and is co-extensive with and is configured to match the lower edge of the opening; in other words, the hinge 60 is curved substantially identically to the curve of the lower edge 38.

Figure 3:
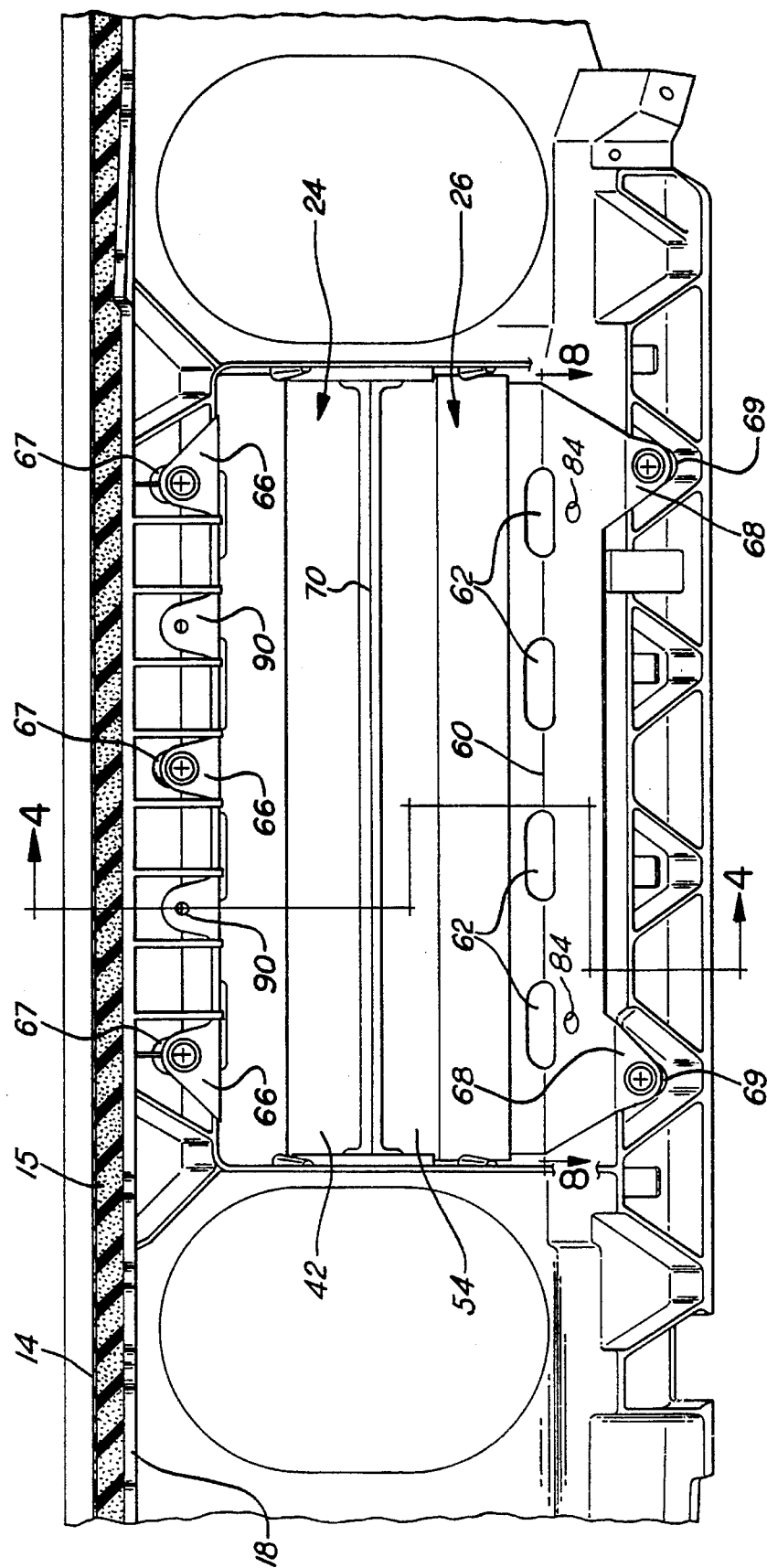
FIG. 3 is a fragmentary view with parts in section showing the doors of the instrument panel assembly as they appear from the inner side of the instrument panel viewed from the right in FIG. 4, with the air bag and air bag canister removed.
Figure 8:
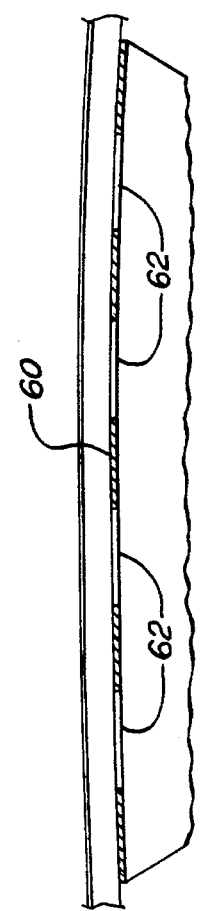
FIG. 8 is a fragmentary sectional view taken on the line 8—8 in FIG. 3.
Figure 4:
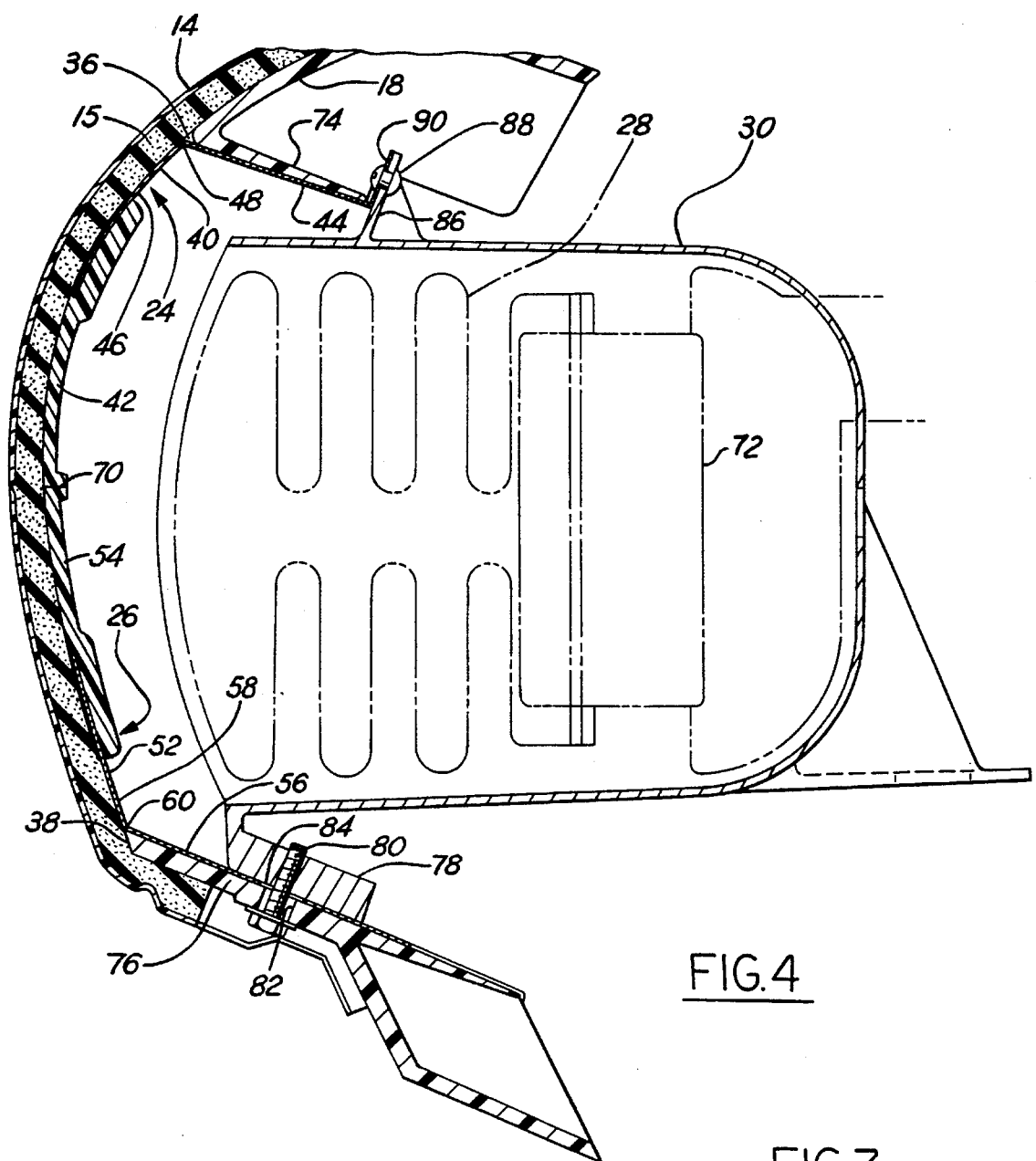
FIG. 4 is a sectional view taken on the line 4—4 in FIG. 3.
Figure 7:
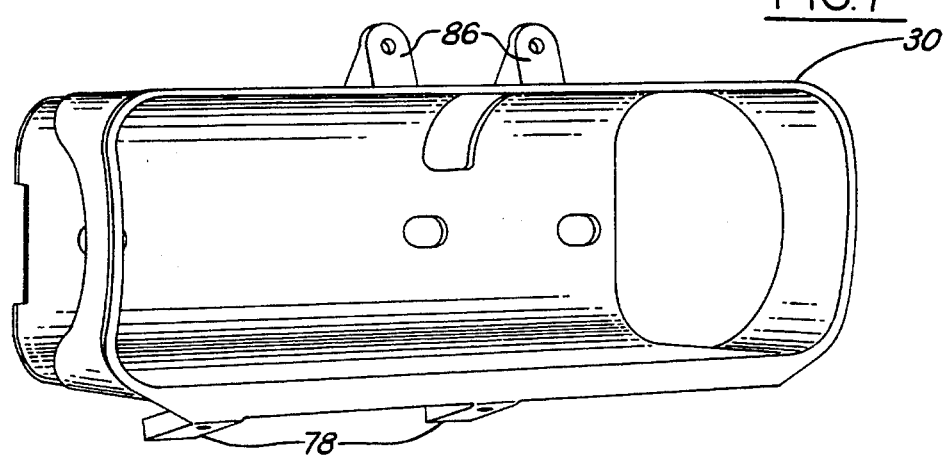
FIG. 7 is a perspective view of the air bag canister.

When thus mounted to the instrument panel, the doors when in closed position have the free edge marginal portions 70 of the pads 42 and 54 thereof in a substantially flush abutting relationship as shown in FIG. 3, 4 and 5 so that in effect and in appearance, the result is the same as a seamless closure. The side edges of the closed doors also abut with the side edges of the opening in a flush relationship. This flush abutment of the doors at the edges will not show through the padding and vinyl cover, as will be understood from FIG. 4.

The air bag 28 is housed in an uninflated, collapsed condition within the canister 30 mounted on the instrument panel forwardly of the opening 20. Also housed in the canister is an inflater 72 which holds a charge for inflating the air bag. Above the canister the instrument panel has an integral air bag chute 74 connecting with the upper edge 36 of opening 20. Below the canister, the instrument panel has an integral air bag chute 76 connecting with the lower edge 38 of opening 20. The door attaching portions 44 and 56 overly the respective air bag chutes 74 and 76.

The canister 30 has mounting tabs 78 at the bottom. Fasteners 80 extend through openings 82 in the lower panel chute 76 of the instrument panel and through registering openings 84 in the attaching portion 56 of the lower door and thread into tabs 78 to mount the lower edge portion of the canister to tabs 78 and the lower chute.

Across the top of the canister are a pair of laterally spaced brackets or flanges 86. Fasteners 88 extend through flanges 86 and through tabs 90 on the attaching portion 44 of the upper door to attach the upper edge portion of the canister to tabs 90 and the upper chute.

The attaching flanges 86 for the canister at the top insure that the air bag will deploy in a path which is substantially perpendicular to the doors, as shown in FIG. 4. When the air bag is deployed, the doors are pushed outwardly to provide an opening for the air bag. If the canister is not attached at the top as shown, it will tend to rock downwardly and forwardly (clockwise in FIG. 4) and place a force against the upper panel chute 74 and reduce the air bag pressure against the doors and hence interfere with the proper deployment of the air bag.

The doors 24 and 26 open about the curved hinges 48 and 60. The tendency of the hinges to kink upon opening, because they are curved, is reduced if not totally eliminated by the slotting of the hinges and by the pads 42 and 54 which place additional weight on the swinging edge portions of the door so that the doors swing open more readily.

The doors will remain intact and not fragment or break away at their hinge points because of the strong, preferably metal construction of the door panels 40 and 52. The pads are not subject to denting and are non-abrasive and thus provide a user friendly surface that is less likely to cause harm when the doors swing open.

When the doors swing open, they easily break through the vinyl cover layer 14 and padding 15 as seen in FIG. 2.

What is claimed is:

1. An instrument panel assembly for an automotive vehicle comprising:

a curved instrument panel wall having an opening, said opening having elongated, spaced apart, upper and lower edges curved in accordance with the curve of said wall, a closure normally closing said opening and covering a stored air bag before it is deployed through the opening in a crash, said closure comprising an upper door having a flexible metal upper door panel, said closure comprising a lower door having a flexible metal lower door panel, said upper door panel having an attaching portion connected thereto by an elongated integral hinge extending along said curved upper edge of said opening, said lower door panel having an attaching portion connected thereto by an elongated integral hinge extending along said curved lower edge of said opening, the attaching portion of each door panel having integral tabs secured to said instrument panel wall, said upper and lower hinges being curved to match the curve of said respective upper and lower edges, each hinge being formed with spaced apart slots along its length, each door panel having an outer edge portion remote from its hinge, and a pad of resinous plastic material molded on and covering the outer edge portion only of each of the door panels, said door panels adapted to swing open about said hinges from a normally closed position when the air bag deploys, said pads having marginal edges which abut in a flush relationship when said doors are in the closed position, said pads and said slots resisting kinking of said hinges when said doors swing open, said instrument panel wall having an integral upper air bag chute connecting with the upper edge of said opening and extending forwardly therefrom, said instrument panel wall having an integral lower air bag chute connecting with the lower edge of said opening and extending forwardly therefrom, an air bag canister for holding a stored air bag, and means for mounting said canister in fixed position between said chutes.

2. An instrument panel assembly as defined in claim 1, wherein said attaching portions of said upper and lower door panels overlie said respective upper and lower chutes, said canister having upper brackets and lower tabs, first means mounting said upper brackets of said canister in fixed position relative to said upper chute, and said second means mounting said lower tabs of said canister in fixed position relative to said lower chute.

3. An instrument panel assembly as defined in claim 2, wherein said first mounting means comprises flanges on said attaching portion of said upper door panel, fasteners securing said upper brackets of said canister to said flanges, and said second mounting means comprises fasteners securing said lower tabs of the canister and said attaching portion of said lower door panel to said lower chute.

\* \* \* \* \*